March 3, 1942. A. F. RUFFIN 2,274,744
INSERT TAB FOR LICENSE PLATES
Filed Nov. 23, 1937
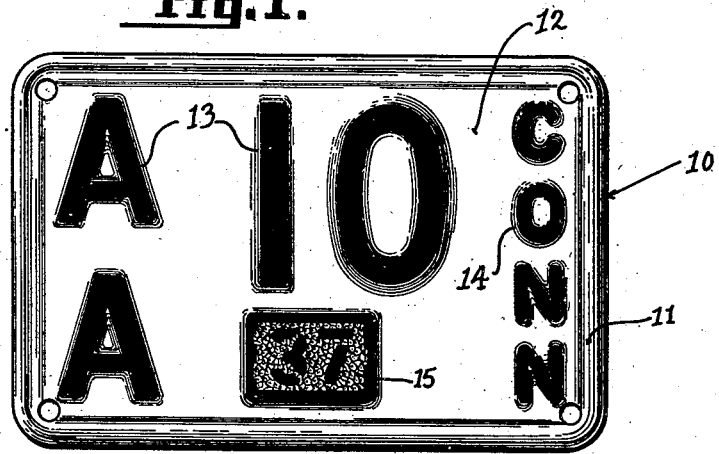
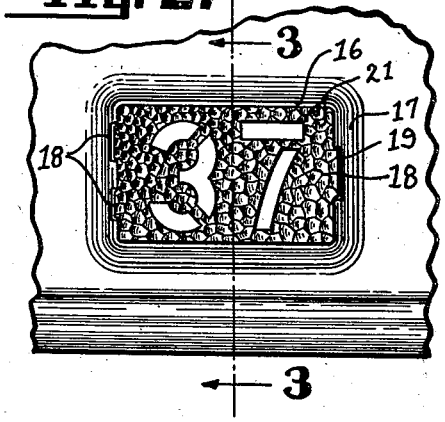
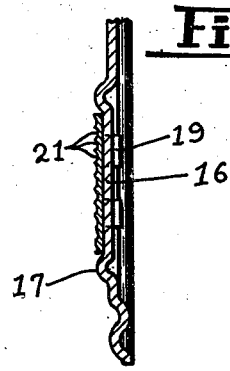
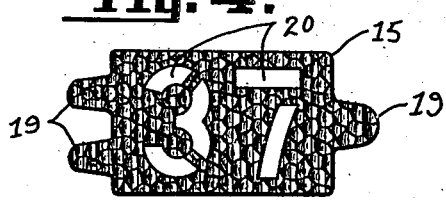
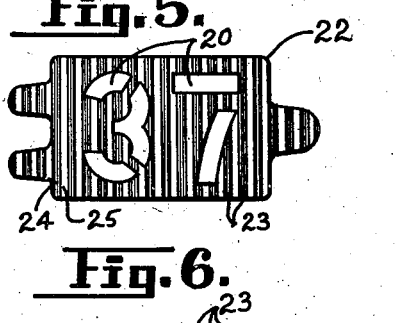
INVENTOR
*Allen F. Ruffin*
BY
*H. F. Johnston*
ATTORNEY Patented Mar. 3, 1942

2,274,744

UNITED STATES PATENT OFFICE 2,274,744

INSERT TAB FOR LICENSE PLATES

Allen F. Ruffin, Waterbury, Conn., assignor to Scovill Manufacturing Company, Waterbury, Conn., a corporation of Connecticut Application November 23, 1937, Serial No. 176,027

18 Claims. (Cl. 40—125)

This invention relates to motor vehicle license plates, and to certain useful improvements in an insert tab indicating the current year to be used in combination with such plates.

In the spirit of economy, it is an object of this invention to provide a license plate which may be used for a period of several years by motor vehicle registrants and which may be revised yearly by simply changing an insert member or tab having the current year indicated thereon, this insert being made and distributed with the minimium of expense and effort.

A further object of this invention is to provide a license plate having raised or embossed indicia with painted surfaces to contrast with the plain surrounding area of the license plate and a similar raised panel which may be painted in the same operation with the raised indicia to provide a background of a color contrasting that of the insert member or tab.

A further object is to provide such a raised panel having a surface slightly raised above that of the panel and forming a border of the contrasting color for said insert.

A further object is to provide an insert tab to be used for such a license plate, having an exposed surface with a roughened or patterned design and reflecting qualities which severally contrast with the plain surrounding area of the license plate and which is designed with a view of producing a light reflective effect to the tab that will serve as a warning signal at night-time, and clearly distinguish the numeral characters of the tab.

In order to assist in accentuating or magnifying the identifying characteristics of such tab or insert member, the tab being relatively small as compared to the license plate, it is the further purpose of this invention to produce a tab in such a manner as to render it readily distinguishable, and also to enhance the legibility of the year indication at night-time, as well as during the day, and at a distance greater than would obtain with an ordinary plain surface tab.

With these and other objects in view the invention consists in the features of construction, combination of elements, and arrangement of parts as will be hereinafter fully described, illustrated in the accompanying drawing and pointed out in the claims hereunto appended.

In the accompanying drawing:

Fig. 1 is a plan view of a license plate constructed in accordance with the invention.

Fig. 2 is an enlarged fragmentary view of that part of the plate surrounding the insert tab area, and including the tab, but omitting the color border as shown in Fig. 1.

Fig. 3 is a vertical section through the same taken along the line 3—3 of Fig. 2.

Fig. 4 is a view of the tab, per se, and lined to indicate the color red.

Fig. 5 is a plan view of an insert tab, per se, showing a modified surfaced effect given to the tab.

Fig. 6 is a long end view of the same to better show the surface contour on the tab.

Referring now to the drawing in which like reference numerals indicate like parts throughout the several views, the numeral 10 indicates a rectangular shaped license plate preferably made of metal and having its peripheral edge formed with a reenforcing bead 11 surrounding a central flat field or surface 12. On this surface 12 may be embossed numerals and or letter indicia 13 indicating the registrant's alotted number and also the abbreviation 14 of the state issuing the license.

In making provision to accommodate the insert tab 15, a portion of the area of the plate 10 is raised above the normal plane thereof to approximately the same height as the indicia 13 in the form of a panel 16, which in turn is preferably surrounded by a raised rib 17 integrally connecting the tab panel 16 with the flat surface 12 of the plate 10 and providing a border around the insert tab which is slightly raised to protect the edges of said tab against the accidental catching of a member thereunder which would tend to raise said edges.

Piercings 18 are provided within the panel or platform 16 adjacent the bead 17 to accommodate lugs 19 extending from the opposite shorter edges of the tab 15 for the purpose of detachably affixing the tab 15 to the plate 10.

Numerals 20 designating the year the tab is issued are preferably sheared out of the tab stock in the manner of a stencil permitting the surface area of the panel or platform 16 to show therethrough.

The raised areas of the letters and numerals 13, the raised areas of the indicia 14, and the raised panel 16 together with the surrounding slightly raised rib 17, are painted a contrasting color to the surface field of the plate.

As the painting operation may be more economically performed by means of suitable resilient rollers which contact only the raised surfaces on the plate, the raising of the panel 16 to substantially the same height as the other indicia on the plain plate, permits the application of a background color for the tab without requiring a separate operation. Since the painting rollers are resilient to the required degree, the slightly higher surface of the rib 17 will not prevent the application of the paint to the surface of the panel 16 to provide a contrasting background which is readily visible through the stencil openings in the insert tab.

In order to give the flat surface area of the tab 15 a distinctive contrasting effect to the plain field 15 of the license plate 10, the top surface thereof is given a roughened or patterned effect to mutilate in one form or another the otherwise smooth surface of said tab. In the preferred construction, and as has been deduced from extensive experimentation, it has been found that the best surface to give the greatest contrasting effect and other desirable results is that of a pitted or hammered effect consisting of a series of closely adjoined concave depressions or pockets having somewhat a honeycomb appearance when viewed at right angles to the plane of the tab surface. These series of hammered depressions naturally produce numerous uniformly distributed high and low light or shadowed and brightened surfaces as a result of any angular light impinging upon the tab surface. In the drawing these concave depressions are given the numeral 21 and in Fig. 2 where the light is illustrated as coming from the left, the left side area of each of the depressions are given a darkened effect by shadow lines, while the right surfaces therethrough are left plain to indicate a brightened surface, which field of numerous shadowed and brightened depressions when taken in its entirely creates a surprisingly contrasting effect with the adjacent plain surface of the license plate 10.

While the above exemplification of the invention suffices to produce the desired contrasting effect between the tab and license plate it is the intention to change the color of the tab from year to year. This color for a given year also will assist in detecting more readily the current validity of the license registration than does the change merely of the yearly indicated numerals provided in the tab. To this end in Fig. 4, I have illustrated the insert tab 15 as being colored red but instead of covering the surface with an ordinary type of paint or enamel it has been found that by subjecting the tab, which in this case is preferably made of aluminum metal, to a special process the tab can be made with greatly increased reflective qualities and incidently serve as a warning signal.

For this additonal effect, three requirements are necessary: first, that the surface treatment shall be substantially equivalent to a dye, in that the resulting tone shall be virtually integral with the surface of the metal; second, that it shall not fill up or obscure the irregularities purposely introduced by the corrugation of the metal, but on the contrary shall preserve and enhance the surface characteristics so obtained; and third, that it shall be resistant to the effects of sun and weather, so as to retain through the full year the quality of its initial appearance.

Accordingly the tab 15 is first subjected to an "anodizing" operation which consists of depositing a coating of aluminum oxide on the tab surface in an electrolytic bath and subsequently applying a red organic dye to the tab that will impregnate the oxide coating of said tab, this dyeing operation in no way changing the original surface contour of the tab and producing a surprisingly brilliant reflective or signalling member for a license plate. The anodizing operation on metal is common practice in the metallic industry, and forms no part of the present invention, except that it is believed that this is the first time that this operaion has been applied to a metal surface having a particular patterned effect for the purpose of creating a new result, namely a pronounced reflective characteristic. It is to be understood that other colors also, aside from red, may be applied to the tab treated according to the above method resulting in producing substantially the same reflective effects.

In Fig. 5 is illustrated a tab 22 having a modified form of surfaced effect. In this case the top surface is formed with a series of angular shaped ribs 23 disposed transversely across the tab creating in effect a series of alternate longitudinal angular shadowed and brightened planes 24 and 25, which when taken in its entirety creates the desired contrasting effect. The tab 22 may be treated in like manner to the preferred tab 15 to give it any desired colored effect.

While there is shown and described herein two pattern effects upon the top surface, it will be appreciated that the tab surface is susceptible of various other formations producing the desired contrasting results of the tab with the license plate. Furthermore, it is to be understood that there are other constructional features of the invention which may be varied as to mechanical details, arrangements of parts, etc. without departing from the spirit of the invention.

What is claimed is:

1. In a license plate, in combination, a plate having numeral indicia thereupon, a portion of said plate raised above the normal plane of said plate and surrounded by a still higher raised rib, and a tab member bearing the year date to be associated with said license plate adapted to be attached to said plate upon said raised portion, the exposed surface of said tab being roughened to give it a decided contrast with the plain surface of said plate.

2. In a license plate defined as by claim 1 wherein the roughened surface of said tab comprises a substantially uniformly hammered or pitted effect of a nature to produce numerous high and low lighted concavities.

3. In a license plate, in combination, a plate having numeral indicia formed and raised above the normal flat surface thereof, a separate rectangular panel similarly raised above the said surface and surrounded by a still higher raised rib which serves to integrally connect said panel to said plate proper, said panel having piercings therethrough adjacent opposite edges, and a tab member bearing the yearly date to be associated with said license plate and having lugs for attachment to said panel through said piercings, the tab being made of the same material as said plate and having its surface provided with a patterned effect to give it a noticeable contrast with the normal plain surface of said plate.

4. In a license plate, in combination, a plate having numeral indicia and a rectangular portion raised above the normal flat surface of said plate, said portion having a color applied thereto in contrast to the plate surface, of a tab member of like material and color to said plate adapted to be detachably affixed to said raised portion, said tab member having indicia pierced therethrough of the yearly date to be associated with said license plate and permitting the color field of said portion to show therethrough in the manner of a stencil, the exposed surface of said tab having a patterned effect to distinctly contrast the latter surface with the surface of said plate of like color.

5. In a license plate, in combination with a plate having upon it permanent indicia and a separate space, the latter being defined by an overlay of color in contrast to the flat surface of the plate, of a tab member having stenciled indicia pierced therethrough and adapted to be detachably affixed upon said space, the tab member being of like material and color to said plate but having its surface roughened to contrast it with surface of said plate.

6. In a license plate according to claim 5 wherein the roughened surface of said tab is further defined as being formed of numerous closely disposed concavities simulating a hammered effect which conduce to produce a field of shadowed and brightened surfaces of a reflective nature.

7. In a license plate according to claim 5 wherein the surface of said tab is further defined as being formed of a series of relative small angular ribs extending across the face thereof and presenting numerous opposed planes alternately shaded and brightened by any source of light.

8. A tab member for detachable attachment to a license plate, comprising a flat metal blank having numerals indicating the year date to be associated with the permanent indicia of said license plate, the exposed surface of said blank being formed with numerous closely associated concavities simulating a hammered or pitted effect, the surface of the blank being oxidized and impregnated with a coloring agent.

9. A tab member according to claim 8 wherein said coloring agent is a dye of a color which serves to enhance the reflective properties of said blank and establish it as a warning signal of danger.

10. A device of the character described comprising a main plate having indicia on its face, a raised panel having openings extending therethrough, an auxiliary plate comprising a stencil defining indicia thereon and prongs on said auxiliary plate adapted to extend through said openings for securing the same on said panel.

11. A device of the character described comprising a main plate having indicia and a raised panel on its face, the said panel having openings therein, an auxiliary plate having indicia thereon, and means adapted to extend through said openings for securing the said auxiliary plate upon said panel; the said auxiliary plate being smaller than the surface of said panel whereby the said surface will provide a border surrounding said auxiliary plate.

12. In combination with a main plate having indicia and a slotted raised panel thereon, an auxiliary plate having stencil openings in the form of indicia and prongs extending through the slots in said panel and bent against the back of said panel for securing said auxiliary plate thereon.

13. The combination of a main plate having insignia thereon comprising letters and figures designating the serial number and State of a registration and a panel thereon; the said letters, numbers and panel having raised surfaces on a substantially equal plane above said main plate, a color medium applied to said raised surfaces, a year number plate having perforations in the form of a number indicating the year of said registration mounted upon said panel and means comprising prongs on said year number plate extending through openings on said panel and bent back upon the rear surface of said main plate for securing said year number plate thereon.

14. A vehicle license plate comprising a main plate having indicia thereon, a raised panel formed out of the body portion of said plate and having a central depression therein, an auxiliary plate having indicia thereon fitted into said depression, said auxiliary plate and panel having cooperating attaching means so constructed and arranged that the auxiliary plate and panel can be assembled in but one rotational relation.

15. A device of the character described comprising a main plate having indicia thereon, a raised panel formed out of the body portion of said plate having its central portion depressed and thus defining a slightly raised frame thereabout, an auxiliary plate fitted into said depressed portion having pierced indicia therein to allow the face of said depressed portion to show therethrough, and means to detachably secure said auxiliary plate in said depressed portion.

16. A device of the character described comprising a main plate having indicia and a raised panel on its face, an auxiliary plate of a size smaller than said panel, means for securing said auxiliary plate centrally upon said panel and thus expose a substantially uniform panel border around said auxiliary plate, said latter plate having indicia pierced therein to permit the face portion of said panel to be exposed therethrough.

17. In combination with a main plate having indicia and a slotted raised panel thereon, an auxiliary plate having stencil openings in the form of indicia and prongs extending through the slots in said panel and bent against the back of said panel for securing said auxiliary plate thereon, the slots in said panel and the prongs on said auxiliary plate being so arranged that said latter plate can be assembled to said main plate in only one position.

18. An automobile registration tag comprising a plate having a main background field with raised indicia to indicate the licensee's permit number reproduced in a color contrasting with the background field of said plate, a panel also raised from said plate and being of a color contrasting with the background field of the plate and a detachable year tab received on said panel having a color contrasting with that on said panel, said year tab being so constructed and arranged relatively to said panel as to expose portions of the panel, and means for detachably securing said year tab on said panel.

ALLEN F. RUFFIN.